United States Patent
Mitchell et al.

(10) Patent No.: US 9,925,983 B2
(45) Date of Patent: Mar. 27, 2018

(54) SYSTEM AND METHOD TO ELIMINATE OR REDUCE FRAME CONTACT DURING OPERATION OF ARTICULATED MACHINE

(71) Applicant: Caterpillar Inc., Peoria, IL (US)

(72) Inventors: Michael D. Mitchell, Aurora, IL (US); Sameer S. Marathe, Yorkville, IL (US); Mark A. Robinson, Davis Junction, IL (US); Wesley T. Payne, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 70 days.

(21) Appl. No.: 15/213,077

(22) Filed: Jul. 18, 2016

(65) Prior Publication Data
US 2018/0015927 A1 Jan. 18, 2018

(51) Int. Cl.
| | |
|---|---|
| B60W 10/04 | (2006.01) |
| B60W 10/18 | (2012.01) |
| B60W 30/18 | (2012.01) |
| B62D 5/065 | (2006.01) |
| B62D 6/00 | (2006.01) |
| B60W 10/20 | (2006.01) |
| B60W 50/00 | (2006.01) |

(52) U.S. Cl.
CPC ...... B60W 30/18145 (2013.01); B60W 10/04 (2013.01); B60W 10/18 (2013.01); B60W 10/20 (2013.01); B60W 50/0098 (2013.01); B62D 5/065 (2013.01); B62D 6/002 (2013.01); B60W 2300/126 (2013.01); B60W 2520/22 (2013.01)

(58) Field of Classification Search
None
See application file for complete search history.

(56) References Cited

U.S. PATENT DOCUMENTS

| | | |
|---|---|---|
| 3,130,806 A | 4/1964 | Baer et al. |
| 6,234,254 B1 | 5/2001 | Dietz et al. |
| 6,389,343 B1 | 5/2002 | Hefner et al. |
| 6,631,320 B1 | 10/2003 | Holt et al. |
| 6,926,113 B2 | 8/2005 | Henneman et al. |
| 7,412,315 B2 | 8/2008 | Wildey et al. |
| 7,555,855 B2 | 7/2009 | Alshaer et al. |
| 7,909,389 B2 * | 3/2011 | Bell ............ E02F 9/166 180/89.14 |
| 9,114,705 B2 | 8/2015 | Goraya et al. |

(Continued)

FOREIGN PATENT DOCUMENTS

JP 2017065525 A * 4/2017

*Primary Examiner* — Mussa A Shaawat
*Assistant Examiner* — Abdhesh K Jha
(74) *Attorney, Agent, or Firm* — Oblon, McClelland, Maier & Neustadt (57) ABSTRACT

A system and method for limiting articulation between a front frame and a rear frame of an articulated machine are disclosed. The system and method receive steering signals and determine impending contact between the front frame and the rear frame based on the received steering signals. Additionally, an amount by which to reduce torque at a hitch coupled between the front and rear frames so as to limit an articulation characteristic of the front frame relative to the rear frame to a predetermined value is determined, responsive to determination of impending contact. Prior to contact, rimpull of the articulated machine is reduced based on the determined amount of torque.

17 Claims, 5 Drawing Sheets

(56) References Cited

U.S. PATENT DOCUMENTS

| | | |
|---|---|---|
| 9,234,330 B2 | 1/2016 | Sharma et al. |
| 2012/0097468 A1* | 4/2012 | Takeda ................. E02F 9/2275 180/311 |
| 2015/0175009 A1 | 6/2015 | Beever et al. |

* cited by examiner

SYSTEM AND METHOD TO ELIMINATE OR REDUCE FRAME CONTACT DURING OPERATION OF ARTICULATED MACHINE

TECHNICAL FIELD

The present disclosure relates to a control system to eliminate or reduce frame contact in an articulated machine and, more particularly, to a control system that determines impending frame contact between frames of an articulated machine and implements a torque reduction control to eliminate or reduce frame contact in the articulated machine.

BACKGROUND

Industries, such as construction, agriculture, mining, often employ articulated machines. An articulated machine includes front and rear frames hinged together by a hitch joint for relative pivotal movement. When one of the frames is moved relative to the other, the articulated machine turns. Sometimes, such articulated machines may over-articulate, i.e., turn at the hitch joint such that the front and rear frames contact each other. Frame contact can occur if rimpull pushing the machine exceeds the machine's steering torque capability. For example, torque generated around the hitch when rimpull pushes the machine into a pile may contribute to the machine exceeding the machine's steering torque capability and can forcibly articulate the machine causing the frames to make contact. Frequent or excessive contact between the front and rear frames is undesirable as such contact may damage the machine, e.g., frame damage, bent axles, breakage of hydraulic lines, etc. Typically a steering system of the machine, alone, may not be capable of preventing over-articulation. In an effort to address over-articulation, an articulated machine may have stops on its frame structure to limit the articulation angle. These stops may prevent the front and rear frames from directly contacting each other when the machine over articulates. However, even frequent or excessive contact of the stops can cause damage to the machine.

U.S. Pat. No. 6,631,320, hereinafter referred as the '320 patent, describes an electronic traction control system for work machines having an articulated chassis made up of a front frame and a rear frame interconnected by an articulation joint. The electronic traction control system includes an electronic controller module to receive an articulation angle signal from an articulation sensor and a wheel speed signal from a wheel speed sensor. The electronic traction control system calculates a desired wheel speed responsive to the articulation angle signal and the wheel speed signals, and selectively applies brakes until the measured wheel speed is equal to the desired wheel speed. The electronic traction control system of the '320 patent provides traction control for an articulated machine; however, such electronic traction control system is not described in the '320 patent as eliminating or reducing frame contact in the articulated machine.

SUMMARY

In one aspect of the present disclosure, an articulated heavy equipment work vehicle is described. The articulated heavy equipment work vehicle includes a front frame having a first pair of wheels and a hydraulically controlled tool, and a rear frame having a second pair of wheels. The articulated heavy equipment work vehicle also includes a hitch pivotally coupling the front frame to the rear frame according to a predetermined maximum mechanical articulation angle range defined by a first frame stop associated with a left-most articulation angle and a second frame stop associated with a right-most articulation angle. The articulated heavy equipment work vehicle further includes a powertrain configured to drive the first and second pairs of wheels, and a steering system configured to provide controlled rotation of the front frame relative to the rear frame about the hitch according to a predetermined articulation angle range less than the predetermined maximum mechanical articulation angle range defined by the first and second frame stops. The articulated heavy equipment work vehicle further includes sensor circuitry configured to sense real-time articulation conditions of the front frame relative to the rear frame. The articulated heavy equipment work vehicle also includes processing circuitry. The processing circuitry is configured to determine impending contact between one of the front frame and the rear frame and one of the first frame stop and the rear frame stop based on signals from the sensor circuitry corresponding to the real-time articulation conditions indicating torque at the hitch exceeds a predetermined torque capability of the steering system. The processing circuitry is also configured to determine an amount by which to reduce torque at the hitch to prevent one of the front and rear frames from contacting one of the first and second frame stops at or above a predetermined force threshold. The processing circuitry is also configured to reduce torque at the hitch by the determined amount so as to prevent one of the front and rear frames from contacting one of the first and second frame stops at or above the predetermined force threshold.

In another aspect of the present disclosure, a system for limiting articulation between a front frame segment and a rear frame segment of an articulated machine is described. The system is configured to receive steering signals, determine impending contact between the front frame segment and the rear frame segment based on the received steering signals, and determine an amount by which to reduce torque at an articulation joint coupled between the front and rear frame segments so as to limit an articulation characteristic of the front frame segment relative to the rear frame segment to a predetermined value, responsive to determination of impending contact between the front and rear frame segments. The circuitry is also configured to, prior to contact between the front frame segment and the rear frame segment, reduce rimpull caused by a propulsion system of the articulated machine based on the determined amount of torque by which to reduce torque at the articulation joint to limit the articulation characteristic of the front frame segment relative to the rear frame segment to the predetermined value.

In yet another aspect of the present disclosure, a method for controlling articulation between a front frame segment and a rear frame segment of an articulated machine is described. The method includes determining, using a processor, torque around an articulation joint of the articulated machine coupling the front and rear frame segments; and comparing, using the processor, the determined torque around the articulation joint to a maximum defined torque capability of the articulated machine at the articulation joint. According to the method, when the determined torque around the articulation joint is at or above the maximum defined torque capability, the method determines, using the processor, an amount of torque by which to reduce the torque around the articulation joint to reach the maximum defined torque capability or below; and outputs, using the processor, a control signal to reduce rimpull caused by a propulsion system of the articulated machine to reduce the torque around the articulation joint to the maximum defined torque capability or below based on the determined amount of torque by which to reduce the torque around the articulation joint. The method further includes controlling the propulsion system to reduce the rimpull such that the torque around the articulation joint is reduced to the maximum defined torque capability or below.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure provide a control system and a method which reduce or, altogether, eliminate incidence of frame contact in articulated machines. More specifically, embodiments of the present disclosure provide a control system and a method that determine impending frame contact between frames of an articulated machine; determine a necessary torque reduction amount or rate to reduce or eliminate contact between the frames; and implement torque reduction control based on the determined torque reduction amount or rate to reduce or eliminate possible contact between the frames (or stops, if present).

Figure 1:
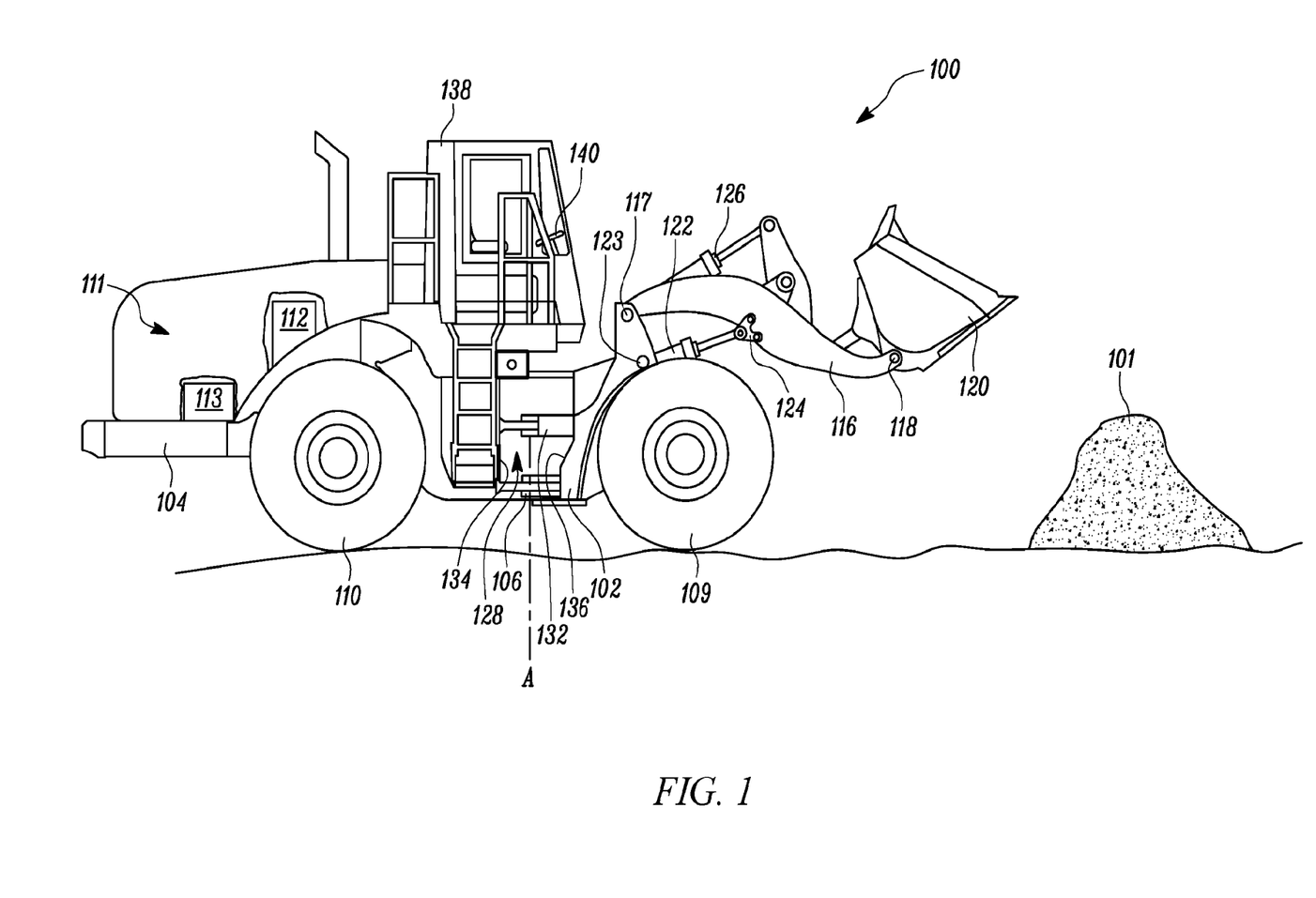
FIG. 1 illustrates a side diagrammatic view of an exemplary articulated machine, in accordance with one or more embodiments of the present disclosure.

Referring to FIG. 1, an articulated heavy equipment work vehicle, generally referenced by the numeral 100, is illustrated. FIG. 1, in particular, illustrates an articulated wheel loader machine which may be employed in industries, such as construction, agriculture, and mining. Although embodiments of the disclosed subject matter are described in relation to an articulated wheel loader machine, embodiments of the disclosed subject matter are not so limited, and may be equally applicable to other earth working machines, such as a hydraulic excavator, a scraper, a haul truck, a motor grader, and any other machine having an articulating arrangement. Further, while a wheeled work machine is shown and described, embodiments of the disclosed subject matter may also be implemented in other work machines, including track-type work machines. In the contact of the present disclosure, the term "articulated heavy equipment work vehicle" is hereinafter simply referred using the term "articulated machine."

The articulated machine 100 may approach a pile of material 101 to perform work on the pile of material. The pile of material may be any of a variety of materials that are to be worked on by the articulated machine 100 (e.g., pushed or carried by the articulated machine and dumped at another location). For example, the pile of material 101 may include gravel, sand, dirt, and the like. In other examples, the pile of material 101 may be an embankment or hill formed of a material, such as clay, embedded rocks. Of course, embodiments of the disclosed subject matter can perform work on materials other than pile of material 101. For example, an articulated machine may be used to push or lift another article, such as a single rock, another piece of machinery, etc.

Figure 2:
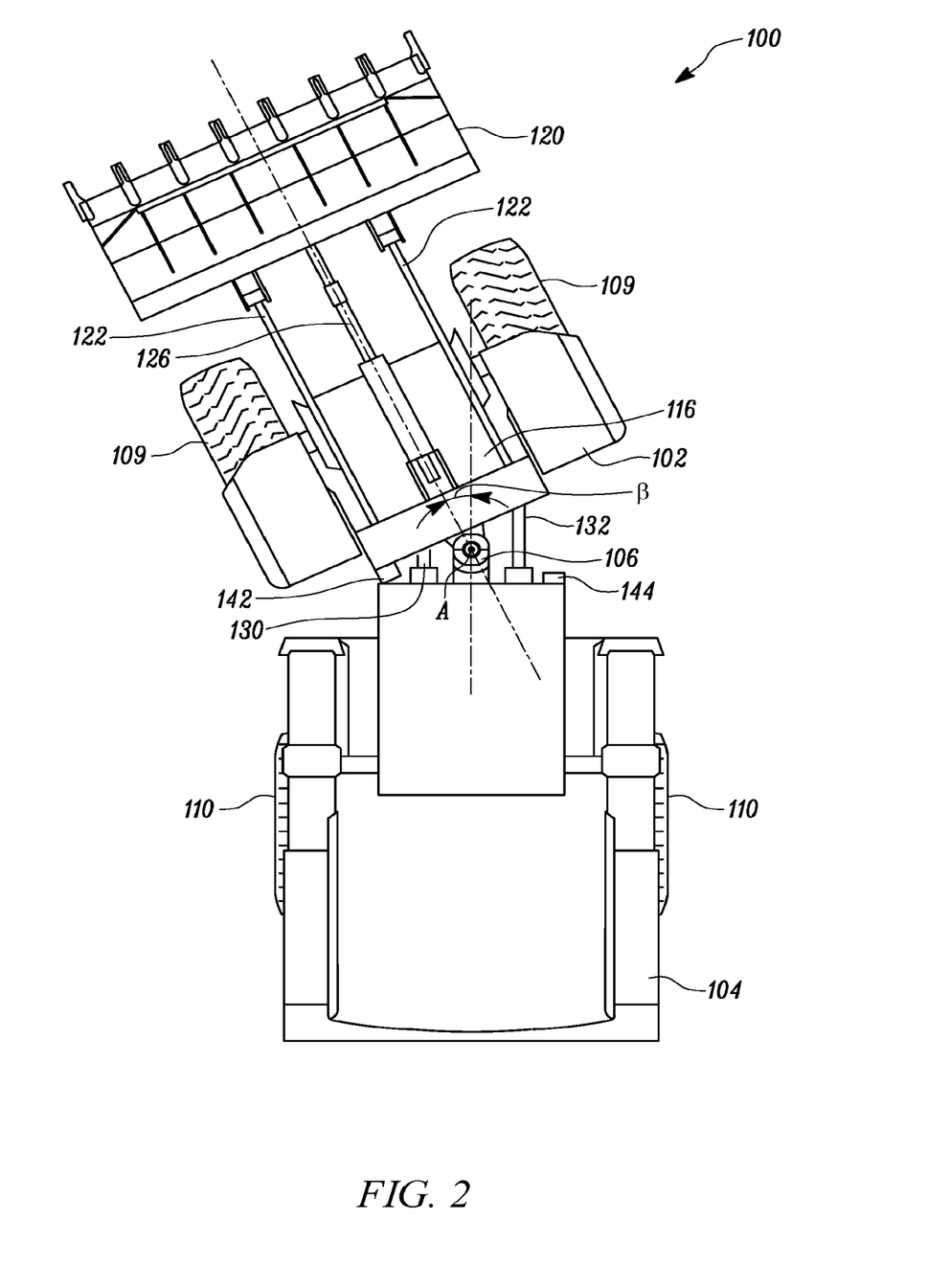
FIG. 2 illustrates a schematic top planar view of the exemplary articulated machine of FIG. 1, in accordance with one or more embodiments of the present disclosure.

Referring to FIGS. 1-2, the articulated machine 100 can include a front frame segment 102 and a rear frame segment 104; hereinafter simply referred to as a front frame 102 and a rear frame 104, respectively. Further, as illustrated, the front frame 102 and the rear frame 104 are pivotally coupled together by a hitch 106. The hitch 106 provides an articulation joint to couple the front frame 102 to the rear frame 104. The term "hitch" as used herein can encompass an articulation joint; and for the purpose of the present disclosure, hereinafter, the term "hitch 106" has been interchangeably used with the term "articulation joint 106." In particular, the hitch 106 may have spaced apart mounting portions (not shown), fixed to each of the front frame 102 and the rear frame 104, which may be affixed together (e.g., pinned together) along a generally vertical axis, represented by 'A' in the drawings. With this configuration, the mounting portions along with the front frame 102 and the rear frame 104 may swivel about the vertical axis 'A,' thereby allowing the articulated machine 100 to steer using the vertical axis 'A,' as described in detail later.

Figure 3:
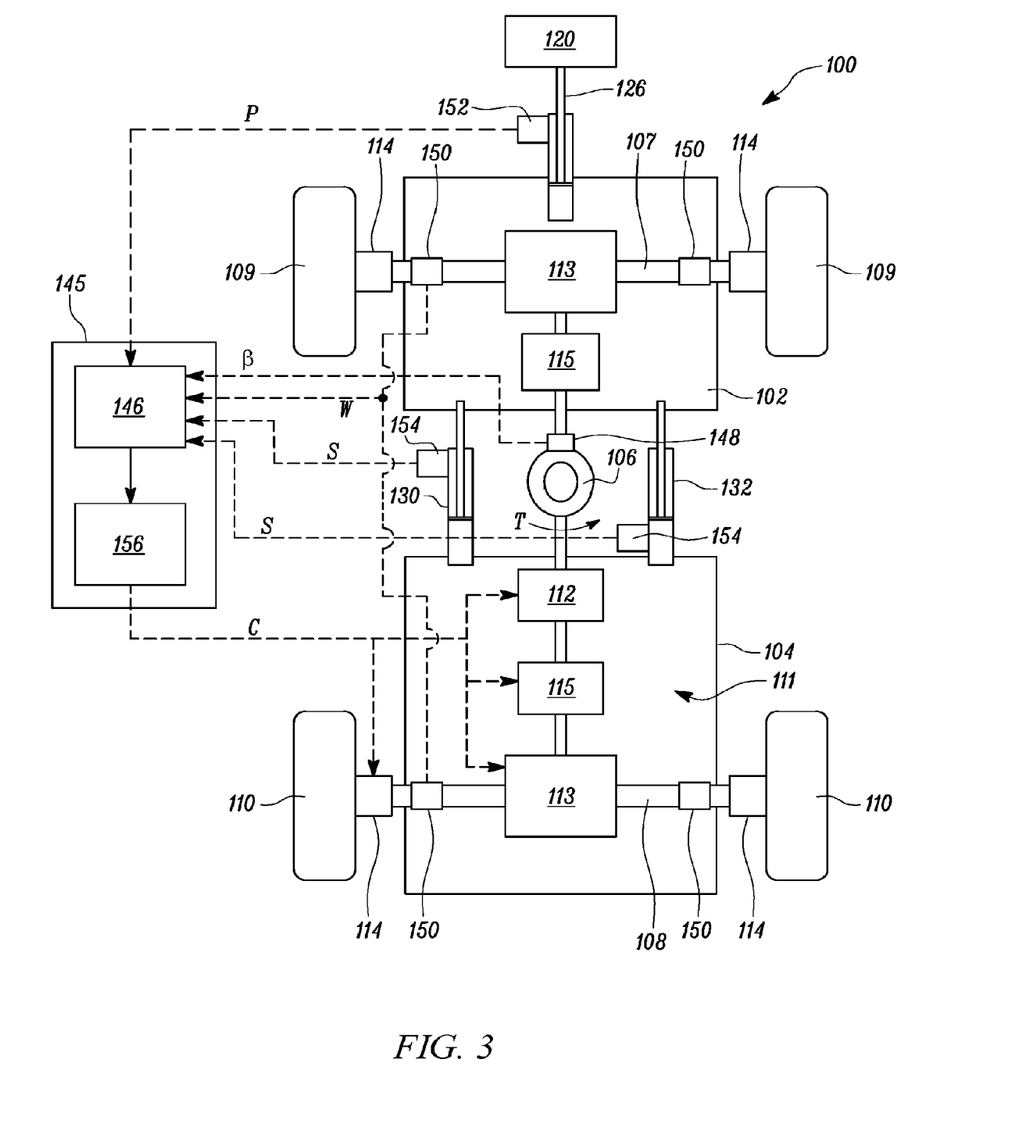
FIG. 3 illustrates a block diagram of a control system of an exemplary articulated vehicle, in accordance with one or more embodiments of the present disclosure.

Now referring to FIGS. 2-3, the articulated machine 100 can include a front axle assembly 107 supported on the front frame 102 and a rear axle assembly 108 supported on the rear frame 104. The articulated machine 100 may also include a first pair of wheels 109 and a second pair of wheels 110 supported by the front axle assembly 107 and the rear axle assembly 108, respectively. It may be seen that FIG. 1 only shows one wheel of each of the first and second pairs of wheels 109, 110. Further, the articulated machine 100 can include a powertrain 111, for example, mounted on the rear frame 104. The powertrain 111, generally, may include a power source 112 and a transmission 113, which provide motive traction to the first and second pairs of wheels 109, 110, and thereby provide movement to the articulated machine 100. The power source 112 may be, for example, a diesel engine, a gasoline engine, a natural gas engine, an electrical engine, a hybrid engine, or any other engine known in the art. The power source 112 may alternatively be a fuel cell, power storage device, or the like. Further, the transmission 113 may be a mechanical transmission, a hydraulic transmission, or any other transmission type known in the art. In some examples, the transmission 113 may be operable to produce multiple output speed ratios (or a continuously variable speed ratio) between the power source 112 and the driven first and second pairs of wheels 109, 110. In the illustration of FIG. 3, for example, the transmission 113 includes a front differential and a rear differential coupled with the front axle assembly 107 and the rear axle assembly 108. In some examples, the transmission 113 may further include a torque converter (not shown) that can assist with transmission of torque generated by the power source 112.

In some examples, the powertrain 111 includes service brakes 114 and one or more clutches 115, which may be operated to control rimpull on the articulated machine 100, caused by a propulsion system (e.g., tires, wheels and supporting components for propulsion) of the articulated machine 100. It may be contemplated that the term "propulsion system" as used herein, can include the power source 112, or more generally the powertrain 111 of the articulated machine 100. The service brakes 114 may be operatively associated with the first and second pairs of wheels 109, 110, to control torque between the wheels and ground. In some examples, the service brakes 114 may be hydraulically applied and spring released service brakes. Further, the clutch 115 may be operatively coupling the power source 112 and the transmission 113 to control rimpull on the articulated machine 100. For example, the clutch 115 may be an impeller clutch associated with the torque converter of the transmission 113, and a slippage of the clutch 115 can reduce a drive torque transmitted to the wheels by the torque converter. In some examples, as shown in FIG. 3, the clutches 115 may be operatively disclosed between the power source 112 and the front and rear differentials of the transmission 113.

As used herein, rimpull may be defined as the drive torque available between the wheels and the ground. In one example, rimpull may be based on torque available at all the wheels of the machine, i.e., both the first and second pairs of wheels 109, 110. In other example, rimpull may be, at the minimum, created by the second pair of wheels 110, i.e., wheels rear of the hitch 106. In yet another example, rimpull may be created only by the first pair of wheels 109, i.e., wheels forward of the hitch 106. Generally speaking, increasing the rimpull can mean increasing the force of the articulated machine 100 as transferred from the first and second pairs of wheels 109, 110 to the ground. In contrast, decreasing the rimpull can mean decreasing the force of the articulated machine 100 as transferred from the first and second pairs of wheels 109, 110 to the ground. Further, generally, the increase or decrease in the rimpull may be achieved by regulating a ratio of engagement of the clutch 115 and/or through application of the service brakes 114, as two non-limiting examples according to one or more embodiments of the disclosed subject matter. As another example, the increase or decrease in the rimpull may be achieved by additionally or alternatively regulating the output of the power source 112. Other methods and systems for increasing or decreasing the rimpull may also be implemented in the articulated machine 100 of the present disclosure without any limitations.

Generally, the articulated machine 100 may include a lift arm 116, typically, supported on the front frame 102. As illustrated, the lift arm 116 has a first end portion 117 that is pivotally mounted to the front frame 102 and a second end portion 118 that mounts a hydraulically controlled tool 120, hereinafter simply referred to as "tool 120." The lift arm 116 may move in a generally vertical plane by a pair of lift cylinders 122 (one shown in FIG. 1) pivotally mounted to the front frame 102 at a first end 123, and mounted to the lift arm 116 at a second end 124. The tool 120 may be a work implement, such as a bucket, as illustrated in FIG. 1, for loading and unloading matter or material. Further, as illustrated, the tool 120 may be pivotally mounted to the lift arm 116, and can be rotatable about the mounting by a linkage cylinder 126, which is pivotally mounted between the lift arm 116 and the tool 120. In one example, the linkage cylinder 126 is a telescopic cylinder with a piston and hydraulic fluid therein. Rotation of the tool 120, for example, for loading and unloading of a pile of material 101, about the mounting for the tool 120 can occur as a result of the extension and retraction of the linkage cylinder 126, which, in turn, can be controlled by regulating a linkage cylinder pressure 'P' of the hydraulic fluid inside the linkage cylinder 126. The linkage cylinder pressure 'P,' as defined herein, generally speaking, may be a measure of resistance force against the pivoting of the front frame 102 relative to the rear frame 104 about the hitch 106, where the resistance force is the opposing force as the rimpull of the articulated machine 100 tries to push the articulated machine 100 against an article, such as a pile of material 101.

The articulated machine 100 can also include a steering system 128 control the articulated movement of the front frame 102 with respect to the rear frame 104 about the vertical axis 'A.' Referring to FIG. 2, as seen from the top view of the articulated machine 100, the steering system 128 can include a first steering cylinder 130 located on a left side of the articulated machine 100 and a second steering cylinder 132 located on a right side of the articulated machine 100, from the perspective of the operator of the articulated machine 100. In particular, the first steering cylinder 130 and the second steering cylinder 132 may be supported between a front portion 134 of the rear frame 104 and a rear portion 136 of the front frame 102. The first and second steering cylinders 130, 132 can be actuated in an opposite manner to control the steering function. In other words, the first steering cylinder 130 can be extended while the second steering cylinder 132 is being retracted, and vice versa. Such simultaneous actuation of the steering cylinders 130, 132 can effect steering of the articulated machine 100, subject, of course, to other forces acting on articulated machine 100, such as forces acting on the tool 120 and one or more wheels of the first and second pairs of wheels. For example, the first steering cylinder 130 located on the left side of the articulated machine 100 may retract while the second steering cylinder 132 located on the right side of the articulated machine 100 simultaneously extends, thereby causing the front frame 102 to pivot counterclockwise about the vertical axis 'A' relative to the rear frame 104 and steering the articulated machine 100 towards the left side. However, in one or more embodiments of the disclosed subject matter, a different configuration of the steering system 128 may be utilized to steer the articulated machine 100, such as a single steering cylinder located at only one side of the articulated machine 100. Further, the steering cylinders 130, 132 may be replaced with other types of actuators, for example, electric motors, hydraulic motors, or the like.

As illustrated, the articulated machine 100 may include an operator station 138. The operator station 138 may include different interface devices (not shown) used for control of the articulated machine 100, along with a variety of displays or indicators to convey information to the operator. The interface devices may include, for example, joysticks, buttons, switches, or other devices used to control movement, such as pivoting, rotating, curling, sliding, swinging, etc. of the lift arm 116, steering of the first pair of wheels 109, and overall articulation of the articulated machine 100. In particular, the interface devices can include a steering control 140 associated with the steering system 128. In one example, the steering control 140 may be in the form of a steering wheel which may be rotated to control the rotational movement of the front frame 102 with respect to the rear frame 104 about the vertical axis 'A,' as desired. In an embodiment, the steering control 140 may generate steering signals, also interchangeably referred to as "an operator steering command rate" or "steering command values," which may regulate steering cylinder pressures 'S' of the first and second steering cylinders 130, 132 of the steering system 128, and thereby control extension and retraction of the first and second steering cylinders 130, 132.

Referring to FIG. 2, it may be seen that the articulated machine 100 is positioned at an articulation angle 'β,' where the front frame 102 is rotated to the left or counter-clockwise relative to the rear frame 104. In an example, a positive value of the articulation angle 'β' may be indicative of counterclockwise pivoting of the front frame 102, from the perspective of an operator facing forward, while a negative value of the articulation angle 'β' may be indicative of clockwise pivoting. In one example of the articulated machine 100 of the present disclosure, the articulation angle 'β' may vary from −40 to +40 degrees. It may be understood that in FIG. 1, the articulated machine 100 is positioned such that a longitudinal axis of the front frame 102 is aligned with a longitudinal axis of the rear frame 104, and thus, in this case, the articulation angle 'β' is close to zero degrees.

In some examples, such as illustrated in FIG. 2, the articulated machine 100 includes a front frame stop 142 and a rear frame stop 144 to limit the articulation angle 'β' of the articulated machine 100. In one example, the front frame stop 142 may be disposed on the left side of the rear portion 136 of the front frame 102, and the rear frame stop 144 may be disposed on the right side of the front portion 134 of the rear frame 104. That is, the front frame stop 142 can be associated with a left-most articulation angle, and the rear frame stop 144 is associated with a right-most articulation angle, as the front frame 102 rotates about the vertical axis 'A.' In other examples, both the frame stops 142, 144 may be disposed on either the front portion 134 or the rear portion 136; or the articulated machine 100 may include four frame stops, where pairs of frame stops are disposed on both the front portion 134 and the rear portion 136 of the front frame 102 and the rear frame 104, respectively.

The front and rear frame stops 142, 144 may limit the articulation angle 'β' of the articulated machine 100 in an effort to prevent the front and rear frames 102, 104 from directly contacting each other. For this purpose, the front and rear frame stops 142, 144 can define a predetermined maximum mechanical articulation angle range for pivoting of the front frame 102 relative to the rear frame 104. In an example, the predetermined maximum mechanical articulation angle range may be 80 degrees or approximately 80 degrees. Thus, in one or more embodiments of the present disclosure, the steering system 128 can regulate or control the pivoting of the front frame 102 relative to the rear frame 104 about the vertical axis 'A' according to a predetermined articulation angle range, where the predetermined articulation angle range is less than the predetermined maximum mechanical articulation angle range as defined by the first and second frame stops 142, 144 (of the front frame 102 and the rear frame 104.

As discussed above, the steering system 128 can control the rotational movement of the front frame 102 with respect to the rear frame 104 about the vertical axis 'A.' In other words, the steering system 128 may provide a torque 'T' at the hitch 106 which causes the rotational movement of the front frame 102 with respect to the rear frame 104 about the vertical axis 'A.' Generally, the torque 'T,' at least in part, can be generated by the extension and retraction of the first and second steering cylinders 130, 132 of the steering system 128. Thus by regulating the steering cylinder pressures 'S' of the first and second steering cylinders 130, 132, the amount of torque 'T' at the hitch 106 may be controlled.

In an embodiment of the present disclosure, the articulated machine 100, or particularly the steering system 128, may have a predetermined torque capability, also interchangeably referred to as maximum defined torque capability or machine torque capability, which may be equivalent to a maximum amount of torque 'T' at the hitch 106 that if exceeded, may result in contact (or contact exceeding a predetermined force threshold) between the front and rear frames 102, 104, or one of the front and rear frames 102, 104 and one of the front and rear frame stops 142, 144, when frame stops 142, 144 are used. Hereinafter, such possible contact has been simply referred using the term "frame contact."

Generally, predetermined torque capability can be viewed as a function of cylinder size, hydraulic relief settings and cylinder point layout of the first and second steering cylinders 130, 132 of the steering system 128, among other factors. For example, the predetermined torque capability of the steering system 128 may correspond to steering cylinder pressure 'P,' also referred to as "predetermined pressure capacity values," or simply "pressure capacity values," of the first and second steering cylinders 130, 132, where the pressure capacity values are thresholds for the steering cylinder pressure 'P' of the first and second steering cylinders 130, 132 such that exceeding these thresholds may result in frame contact, possible frame contact, or frame contact that would exceed a predetermined force threshold).

According to an embodiment of the present disclosure, the articulated machine 100 includes a control system 145, also sometimes simply referred to as system 145, for limiting articulation between the front frame 102 and the rear frame 104 therein. In general, the control system 145 can include circuitry and/or a processor that determines impending frame contact in the articulated machine 100, and implements torque reduction control based on a determined torque reduction amount or rate to reduce or eliminate the frame contact. Put another way, the control system 145 can detect articulation characteristics, deduce from the articulation characteristics an impending contact between the front frame 102 and the rear frame 104 (or frame stops or a frame stop and the front frame or rear frame), compute from the articulation characteristics a necessary torque reduction amount, and reduce the torque the computed amount, for instance, by modulating the powertrain 111 and/or the steering system 128 of the articulated machine 100 to reduce the torque exerted on the articulated machine 100.

In particular, the control system 145 can include sensor circuitry 146 having, for instance, multiple sensors, such as, capacitive, resistive, potentiometric, piezoelectric, or any other type electromechanical sensors, associated with various components of the articulated machine 100 for sensing a variety of different parameters related to dynamics of the articulated machine 100. Specifically, the sensor circuitry 146 may sense real-time articulation conditions of the front frame 102 relative to the rear frame 104. The sensor circuitry 146 may include an articulation sensor 148 operatively associated with the hitch 106 to determine the articulation angle 'β,', also known as the real-time articulation angle 'β,' in any known manner, such as, but not limited to, using gyroscopes and/or accelerometers. The articulation sensor 148 may further utilize the value of the real-time articulation angle 'β' to determine an articulation rate, i.e., the rate of change of the articulation angle 'β' in the articulated machine 100. The sensor circuitry 146 may also include individual wheel torque sensors 150 operatively associated with the first and second pairs of wheels 109, 110 to determine available wheel torque, represented by 'W,' at the wheels 109, 110. Generally, the wheel torque 'W' may be interpreted as a measure of the rimpull between the first and second pairs of wheels 109, 110 and the ground. Further, the sensor circuitry 146 may include a linkage cylinder sensor 152 associated with the linkage cylinder 126 to determine the linkage cylinder pressure 'P,' and steering cylinder sensors 154 associated with each of the first and second steering cylinders 130, 132 to determine the steering cylinder pressure values 'S.'

Put another way, the sensor circuitry 146 may receive a steering angle signal representative of a steering angle (which may be equivalent to the articulation angle 'β'), a steering rate signal representative of a rate at which the steering angle is changing (which may be equivalent to the articulation rate), a wheel torque signal representative of available torque at the wheels 109, 110 (which may be equivalent to the wheel torque 'W'), a plurality of cylinder pressure signals representative of pressure of respective steering cylinders 130, 132 (which may be equivalent to the steering cylinder pressure 'S'), and at least one linkage pressure signal representative of an amount of resistance provided against the articulated machine (which may be equivalent to the linkage cylinder pressure 'P'), from respective sensors.

The control system 145 can further include processing circuitry 156, sometimes simply referred to as processor 156, in communication with the sensor circuitry 146, to receive various sensed values or the signals generated by the sensor circuitry 146. The processing circuitry 156 may be a logic unit using one or more integrated circuits, microchips, microcontrollers, microprocessors, all or part of a Central Processing Unit (CPU), Graphics Processing Unit (GPU), Digital Signal Processor (DSP), Field Programmable Gate Array (FPGA), or other circuits suitable for executing instructions or performing logic operations. Other peripheral circuitry such as buffers, latches, switches and so on may be implemented within the processing circuitry 156 or separately as desired. Various other circuits may also be associated with the processing circuitry 156, such as power supply circuitry, signal conditioning circuitry, solenoid driver circuitry, and other types of circuitry. Further, the processing circuitry 156 may be associated with a software product stored on a non-transitory computer readable medium (not shown) and comprising data and computer implementable instructions. The non-transitory computer readable medium may include a memory, such as RAM, ROM, a flash memory, a hard drive, etc. The computer readable medium may also be configured to store electronic data associated with operation of the articulated machine 100.

In an embodiment, the processing circuitry 156 can determine an impending frame contact. The term "impending contact" can mean that, with the real-time articulation conditions, the probability of frame contact (including frame contact that would likely exceed a predetermined force threshold) is reasonably high. Further, the impending contact may be a function of the predetermined maximum mechanical articulation angle range. The impending contact is determined using the processing circuitry 156 when one or more signals from the sensor circuitry 146 corresponding to the real-time articulation conditions indicates that the torque 'T' at the hitch 106 exceeds or is anticipated to exceed the predetermined torque capability of the steering system 128.

In a first example, the impending contact may be determined by a comparison between the steering signal, the real-time articulation angle 'β' and/or the articulation rate. The processing circuitry 156 can determine that there is impending contact when the sensed real-time articulation conditions indicate that the real-time articulation rate is at or above a predetermined articulation rate threshold with no steering signal, where the predetermined articulation rate threshold may be equivalent to the articulation rate being exceeded that may result in possible frame contact. In other words, the processing circuitry 156 can determine that there is impending contact when the front frame 102 is articulating relative to the rear frame 104 at or above the predetermined articulation rate and the steering signal is zero.

In a second example, the impending contact may be determined by a comparison between the pressure capacity values of the steering cylinders 130, 132 and real-time pressure values 'S' of the steering cylinders 130, 132 corresponding to the sensed real-time articulation conditions. As discussed, the pressure capacity values of the steering cylinders 130, 132 can be thresholds for the real-time pressure values 'S' of the steering cylinders 130, 132, where exceeding such thresholds may result in possible frame contact. Therefore, the processing circuitry 156 can determine that there is impending contact when the real-time pressure values 'S' are at or above the pressure capacity values of the steering cylinders 130, 132, or more particularly, the real-time pressure value 'S' of one of the steering cylinders 130, 132 exceeds the predetermined pressure capacity of the corresponding steering cylinders 130, 132 to hold the predetermined amount of torque.

In a third example, the impending contact may be determined by a comparison between real-time linkage cylinder pressure values 'P' and a predetermined linkage cylinder pressure threshold, where the predetermined linkage cylinder pressure threshold is a threshold for the real-time linkage cylinder pressure values 'P,' where exceeding such threshold may result in possible frame contact. The processing circuitry 156 can determine that there is impending contact when one or more of the real-time linkage cylinder pressure values 'P' are at or above the predetermined linkage cylinder pressure threshold. Further, the comparison as described in the third example may be utilized when the front frame 102 is articulated relative to the rear frame 104 and the tool 120 is in engagement with an obstacle, such as a pile of material 101.

Embodiments of the disclosed subject matter can implement the control examples discussed above exclusively or together, for instance, two of the examples implemented together or all three of the examples implemented together.

The various thresholds as described above, for determining the impending frame contact, may vary depending on the value of the articulation angle 'β.' For example, when the articulation angle 'β' is substantially less than the maximum allowed articulation angle as per the steering range limits, the thresholds may be relatively high to allow for relatively fast maneuverability/steering of the articulated machine 100; however when the articulation angle 'β' is approaching close to the maximum allowed articulation angle as per the steering range limits, i.e., the articulated machine 100 is approaching close to frame contact, the thresholds may be relatively low to limit or prevent the over articulation of the frames 102, 104, and, thereby, reduce or eliminate the possible frame contact. These values of the thresholds can increase, e.g., in an incremental, polynomial and/or exponential fashion, as the absolute value of the articulation angle 'β' increases, and vice-versa.

Further, the processing circuitry 156 can determine an amount by which to reduce the torque 'T' at the hitch 106 to prevent frame contact at or above a predetermined force threshold, as noted above.

In a first example, the amount by which to reduce the torque 'T' at the hitch 106 can based on a calculated target articulation rate, where the calculated target articulation rate is defined as the articulation rate where the probability of frame contact at or above the predetermined force threshold is zero or close to zero. That is, the torque 'T' at the hitch 106 can be reduced by an amount such that the articulation rate of the articulated machine 100 reaches the calculated target articulation rate. In a second example, the amount by which to reduce the torque 'T' at the hitch 106 can be based on the rimpull caused by at least one of the first pair of wheels 109 and the second pair of wheels 110. Specifically, the amount by which to reduce the torque 'T' at the hitch 106 may be proportional to the reduction in the rimpull of the articulated machine 100 such that the probability of frame contact at or above the predetermined force threshold is zero or close to zero. Optionally, the rimpull may be reduced continuously to minimize damage to the components of the articulated machine 100. In one or more embodiments of the present disclosure, the predetermined force threshold may be zero, i.e., meaning no contact between the frames (or frame stops).

Still further, the processing circuitry 156 can issue a control signal 'C' to components of the articulated machine 100 to reduce the torque 'T' at the hitch 106 by the determined amount to prevent frame contact at or above the predetermined force threshold. The generated control signal 'C' may be transmitted to one or more components of the powertrain 111, namely the power source 112, the transmission 113, the service brakes 114, the clutches 115, and the steering system 128. For the purpose of illustration, the control signal 'C' is only shown to be transmitted to the components in the rear frame 104 in FIG. 3; however, the control signal 'C' may also be transmitted to components in the front frame 102.

In some examples, as discussed above, torque reduction may be progressive, depending upon machine parameters, e.g., as the articulation angle 'β' approaches closer to its limit, indicating that frame contact is more likely, the amount by which the torque is reduced may be increased. In one example, the processing circuitry 156 reduces the torque 'T' at the hitch 106 by modulation of the powertrain 111 and/or the steering system 128. The modulation of the powertrain 111 may include one or more of application of the service brakes 114 and slipping of the clutch 115. The application of the service brakes 114 may reduce torque at the wheels which reduce the rimpull and in turn reduce the torque 'T' at the hitch 106, while slippage of the clutch 115 downstream of the power source 112 may reduce the driving torque transmitted to the wheels 109, 110, which, in effect, can reduce the rimpull and thus the torque 'T' at the hitch 106. In some examples, the modulation of the powertrain 111 may further include reducing the torque transmitted to one or both of the pairs of wheels 109, 110 by reducing the output of the power source 112 and/or changing the gear ratio of the transmission 113 of the powertrain 111. Further, the modulation of the steering system 128 may include reducing the pressure values 'S' for the first and second steering cylinders 130, 132 and/or reducing the linkage cylinder pressure 'P' of the linkage cylinder 126, both in turn reducing the torque 'T' at the hitch 106.

In some examples, the control system 145 may further include a feedback unit (not shown) for an operator of the articulated machine 100, as one of the interface devices in the operator station 138. The feedback unit may be in the form of a warning light to notify the operator in advance, for example, that the powertrain 111 is being de-rated because an impending frame contact is determined. The control system 145 may further include a computing unit (not shown), which may record and/or transmit to a remote location in real time or in a batch one or more of the number and/or magnitude of all frame contacts, the number of frame contacts that may have been avoided, and the reduction in magnitude of the frame contact by application of the control system 145 to reduce torque. The computing unit may further be programmed to plot this information as infographic for easy understanding of the operator.

INDUSTRIAL APPLICABILITY

Machines having independent front and rear frames, articulated with respect to each other about a vertical axis, are widely used in off-road industries. For example, many wheel loaders are articulated machines that steer at least by "bending" the front and/or rear frames with respect to each other (and not by directly "turning" the wheels in some instances). In such machines, as the articulation between the front frame and the rear frame increases, there is an increased chance of the front and rear frames contacting each other.

Articulation is generally caused by operator command to steering system; however, it may be inadvertently induced, for instance, by terrain or machine operating characteristics. For example, even when the operator steering command is zero (i.e., steering angle command is for a zero steering angle or steering rate command is for a zero steering rate), other factors may still cause articulation from the zero-angle and/or zero-rate, such as front tire pressure mismatch between the left and right front tires and/or uneven ground or pile conditions. Under such conditions, a cause of such inadvertent over articulation may be the machine's own rimpull generating a force that creates a torque around the hitch. Sometimes, stops are provided on the frame structure to limit the over articulation in an effort to prevent the front and rear frames from contacting each other. However, frequent or excessive contact even with the stops may still damage the machine.

The control system 145 of the present disclosure can limit articulation between the front frame 102 and the rear frame 104 of the articulated machine 100 by employing circuitry to receive steering signals; determine impending contact between the front frame 102 and the rear frame 104 based on the received steering signals; determine the amount by which to reduce torque 'T' at the hitch 106 so as to limit an articulation characteristic of the front frame 102 relative to the rear frame 104 to a predetermined value, responsive to determination of the impending contact between the front frame 102 and the rear frame 104; and take action, prior to contact between the front frame 102 and the rear frame 104, to reduce rimpull caused by the propulsion system of the articulated machine 100 based on the determined amount of torque by which to reduce the torque 'T' at the hitch 106 to limit the articulation characteristic of the front frame 102 relative to the rear frame 104 to the predetermined value.

The steering signals can include at least one of an articulation angle signal, an articulation angular speed signal, an articulation angle command signal, one or more steering cylinder pressure signals, one or more linkage cylinder pressure signals, and tire pressure differential signals associated with opposing tires of the propulsion system; the terms used herein having their usual meanings. Further, the term "articulation characteristic," as used herein, can mean or can include an estimate of tendency of the front frame 102 to pivot relative to the rear frame 104 at the hitch 106 about the vertical axis 'A' in the articulated machine 100. In one example, the articulation characteristic may be defined in terms of a maximum articulation angle from a zero articulation angle. In other example, the articulation characteristic may be defined in terms of the articulation rate. As discussed earlier, the reduction in rimpull can prevent frame contact at or above the predetermined force threshold (which may be zero in a case where contact is prevented entirely). In one example, the rimpull of the articulated machine 100 can be reduced continuously, for example, until the articulation characteristic reaches the predetermined value.

Figure 4:
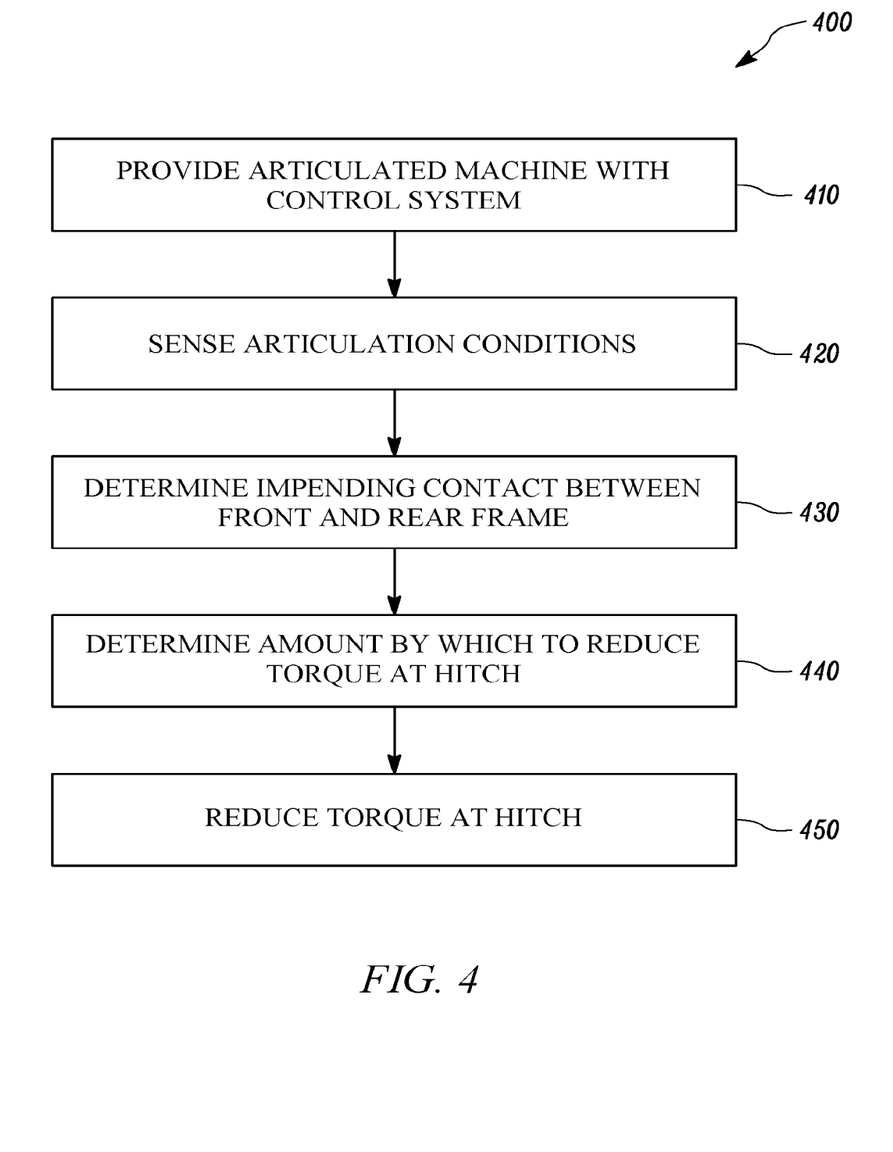
FIG. 4 illustrates a flowchart representing a method of limiting articulation between a front frame and a rear frame of the exemplary articulated machine, in accordance with one or more embodiments of the present disclosure.

Operations involved in limiting articulation between the front frame 102 and the rear frame 104 of the articulated machine 100 according to one or more embodiments of the disclosed subject matter has been represented in the form of a flowchart 400, as illustrated in FIG. 4.

At block 410, the articulated machine 100 with the control system 145 is provided. At block 420, the articulation and/or the steering conditions can be sensed, using, for example, the sensor circuitry 146. At block 430, the impending contact between the front and rear frames 102, 104 can be determined, using the processing circuitry 156, for instance. At block 440, an amount by which to reduce the torque 'T' at the hitch 106 can be determined, for instance, using the processing circuitry 156. At block 450, the torque 'T' at the hitch 106 can be reduced using the processing circuitry 156, for instance.

Figure 5:
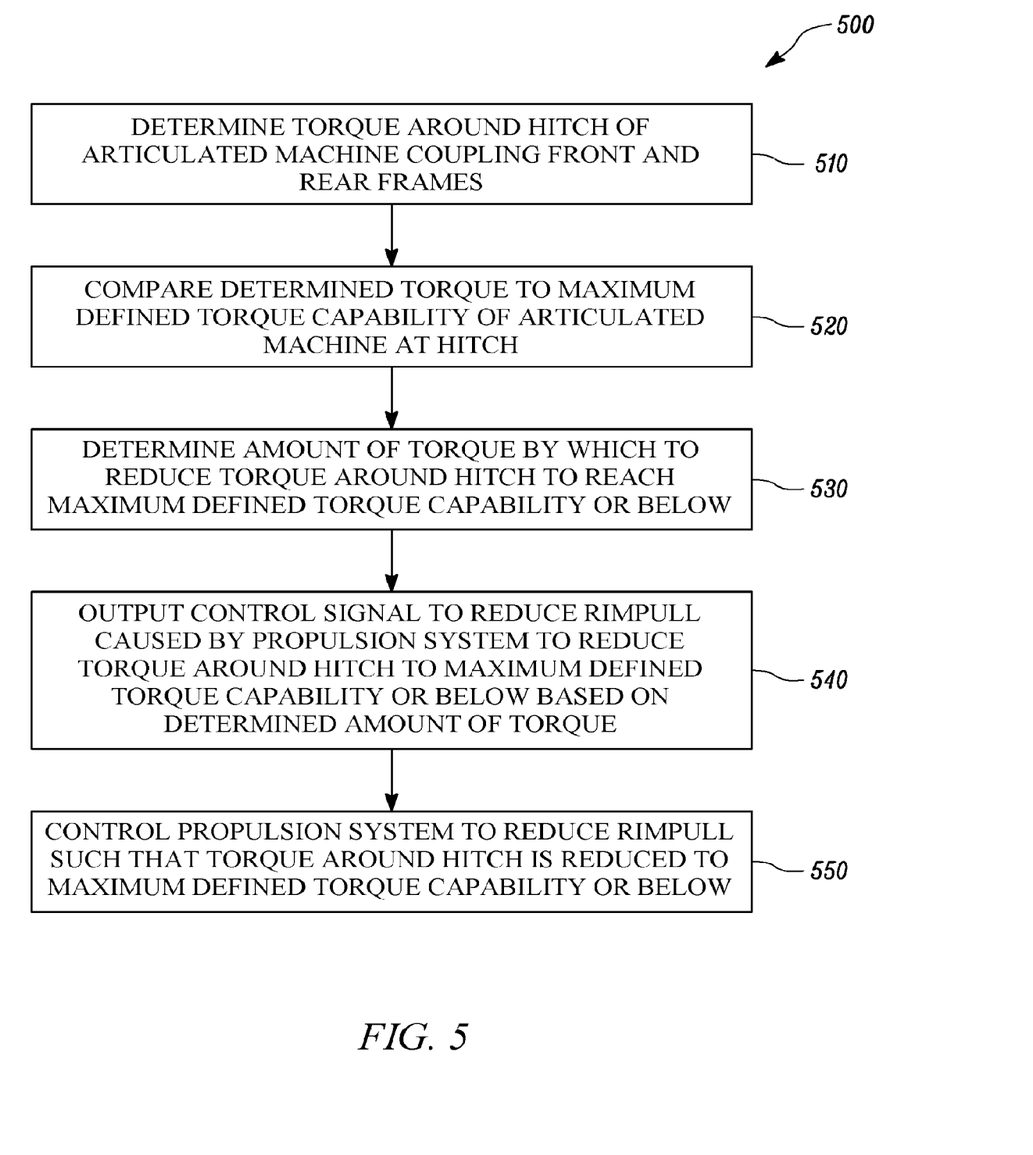
FIG. 5 illustrates a flowchart representing a method for controlling articulation between the front frame and the rear frame of the exemplary articulated machine, in accordance with one or more embodiments of the present disclosure.

The present disclosure also provides a method 500 for controlling articulation between the front frame 102 and the rear frame 104 of the articulated machine 100, as illustrated in the form of a flowchart in FIG. 5.

Block 510 of method 500 can include determining, using the processing circuitry 156, for instance, the torque 'T' around the hitch 106 of the articulated machine 100.

Block 520 of the method 500 can include comparing, using the processing circuitry 156, for instance, the determined torque around the hitch 106 to the maximum defined torque capability of the articulated machine 100 at the hitch 106.

Block 530 of the method 500 can include determining, using the processing circuitry 156, for instance, when the torque around the hitch 106 is at or above the maximum defined torque capability; and determining, using the processing circuitry 156, for instance, the amount of torque by which to reduce the torque around the hitch 106 to reach the maximum defined torque capability or below. The determined torque around the hitch 106 at or above the maximum defined torque capability can indicate an impending contact between the front frame 102 and the rear frame 104.

Block 540 of the method 500 can include outputting, using the processing circuitry 156, for instance, the control signal 'C' to reduce rimpull caused by the propulsion system of the articulated machine 100 to reduce the torque around the hitch 106 to the maximum defined torque capability or below, based on the determined amount of torque by which to reduce the torque around the hitch 106. The amount of torque by which to reduce the torque around the hitch 106 to reach the maximum defined torque capability or below can prevent contact (which may be or include contact above a predetermined force threshold) between the front frame 102 and the rear frame 104, or contact between the front frame 102 and the rear frame 104 (or corresponding frame stops).

Block 550 of the method 500 can include controlling the propulsion system to reduce the rimpull such that the torque around the hitch 106 is reduced to the maximum defined torque capability or below. Controlling the propulsion system to reduce the rimpull may include modulating the powertrain 111 of the propulsion system. In one example, the rimpull can be reduced continuously until the articulation rate of the rear frame 104 relative to the front frame 102 reaches a predetermined target rate, where the predetermined target rate may be the articulation rate, for given articulation conditions, with relatively low probability of frame contact.

The system and method of the present disclosure may reduce the intensity and/or frequency of frame contact, either between the front frame 102 and the rear frame 104, or one of the front frame 102 and the rear frame 104 and one of the front frame stop 142 and the rear frame stop 144 of the articulated machine 100 when the frame stops 142, 144 are provided. Further, the present disclosure may be employed to reduce the number of frame contacts (including eliminating the frame contacts) and/or reduce the magnitude of frame contact. Thereby, embodiments of the present disclosure may reduce or eliminate damage to the articulated machine 100, such as frame damage, axle bending, and/or damage to hydraulic lines. Further, removing the need for frame stops can lower weight or strength requirements for the frames 102, 104 of the articulated machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An articulated heavy equipment work vehicle comprising:
   a front frame having a first pair of wheels and a hydraulically controlled tool;
   a rear frame having a second pair of wheels;
   a hitch pivotally coupling the front frame to the rear frame according to a predetermined maximum mechanical articulation angle range defined by a first frame stop associated with a left-most articulation angle and a second frame stop associated with a right-most articulation angle;
   a powertrain configured to drive the first and second pairs of wheels;
   a steering system configured to provide controlled rotation of the front frame relative to the rear frame about the hitch according to a predetermined articulation angle range less than the predetermined maximum mechanical articulation angle range defined by the first and second frame stops;
   a sensor circuitry configured to sense real-time articulation conditions of the front frame relative to the rear frame; and
   a processing circuitry configured to
   determine an impending contact between one of the front frame and the rear frame and one of the first frame stop and the second frame stop based on signals from the sensor circuitry corresponding to the real-time articulation conditions indicating torque at the hitch exceeds a predetermined torque capability of the steering system,
   wherein the impending contact between the one of the front and rear frames and the one of the first and second frame stops is determined based on at least one of the following: a comparison between a steering command value and a real-time articulation angle and rate corresponding to the sensed real-time articulation conditions indicating that the real-time articulation rate is at or above a predetermined articulation rate threshold with no steering command value, a comparison between pressure capacity values of steering cylinders of the steering system to hold the predetermined torque capability and real-time pressure values of the steering cylinders corresponding to the sensed real-time articulation conditions indicating that the real-time pressure values exceed the pressure capacity values of the steering cylinders and a comparison between real-time linkage cylinder pressure values and a predetermined linkage cylinder pressure threshold indicating that one or more of the real-time linkage cylinder pressure values exceeds the predetermined linkage cylinder pressure threshold when the front frame is articulated relative to the rear frame,
   determine an amount by which to reduce torque at the hitch to prevent the one of the front and rear frames from contacting the one of the first and second frame stops at or above a predetermined force threshold, and reduce torque at the hitch by the determined amount so as to prevent the one of the front and rear frames from contacting the one of the first and second frame stops at or above the predetermined force threshold.

2. The articulated heavy equipment work vehicle according to claim 1, wherein the predetermined force threshold is zero.

3. The articulated heavy equipment work vehicle according to claim 1, wherein the amount by which to reduce torque at the hitch is an articulation rate to reach a calculated target articulation rate.

4. The articulated heavy equipment work vehicle according to claim 1, wherein the amount by which to reduce torque at the hitch is an amount by which to reduce rimpull caused by at least one of the first pair of wheels and the second pair of wheels.

5. The articulated heavy equipment work vehicle according to claim 1, wherein the circuitry is configured to reduce torque at the hitch by application of at least one of service brakes, clutch slippage downstream of an engine of the articulated heavy work vehicle, modulating the powertrain, and modulating the steering system.

6. A system for limiting articulation between a front frame segment and a rear frame segment of an articulated machine, comprising:
   a circuitry configured to receive steering signals,
   determine an impending contact between the front frame segment and the rear frame segment based on the received steering signals,
   wherein the circuitry is further configured to implement at least one of the following to determine the impending contact between the front frame segment and the rear frame segment: the front frame segment is articulating relative to the rear frame segment at or above a predetermined articulation rate and an operator steering command rate is zero, pressure of a steering cylinder exceeds a predetermined pressure capacity of the steering cylinder to hold a predetermined amount of torque, and pressure of a linkage cylinder representative of an amount of resistance against the articulated machine is at or above a predetermined linkage pressure threshold,
   determine an amount by which to reduce torque at an articulation joint coupled between the front and rear frame segments so as to limit an articulation characteristic of the front frame segment relative to the rear frame segment to a predetermined value, responsive to determination of the impending contact between the front and rear frame segments, and prior to contact between the front frame segment and the rear frame segment, reduce rimpull caused by a propulsion system of the articulated machine based on the determined amount of torque by which to reduce torque at the articulation joint to limit the articulation characteristic of the front frame segment relative to the rear frame segment to the predetermined value.

7. The system according to claim 6, wherein the articulation characteristic is a maximum articulation angle from a zero articulation angle.

8. The system according to claim 6, wherein the articulation characteristic is an articulation rate.

9. The system according to claim 6, wherein the reduction in rimpull prevents contact between the front and rear frame segments.

10. The system according to claim 6, wherein the reduction in rimpull prevents contact between the front and rear frame segments above a predetermined force threshold.

11. The system according to claim 6, wherein the steering signals include at least one of an articulation angle signal, an articulation angular speed signal, an articulation angle command signal, one or more steering cylinder pressure signals, one or more linkage cylinder pressure signals, and tire pressure differential signals associated with opposing tires of the propulsion system.

12. The system according to claim 6, wherein the rimpull is reduced continuously until the articulation characteristic reaches the predetermined value.

13. A method for controlling articulation between a front frame segment and a rear frame segment of an articulated machine, comprising:

determining, using a processor, a torque around an articulation joint of the articulated machine coupling the front and rear frame segments;

wherein determining the torque around the articulation joint is based on at least one of the following signals: a steering angle signal representative of a steering angle, a steering rate signal representative of a rate at which the steering angle is changing, a plurality of cylinder pressure signals representative of pressure of respective steering cylinders, and at least one linkage pressure signal representative of an amount of resistance provided against the articulated machine, comparing, using the processor, the determined torque around the articulation joint to a maximum defined torque capability of the articulated machine at the articulation joint;

when the determined torque around the articulation joint is at or above the maximum defined torque capability, determining, using the processor, an amount of torque by which to reduce the torque around the articulation joint to reach the maximum defined torque capability or below;

outputting, using the processor, a control signal to reduce rimpull caused by a propulsion system of the articulated machine to reduce the torque around the articulation joint to the maximum defined torque capability or below based on the determined amount of torque by which to reduce the torque around the articulation joint; and controlling the propulsion system to reduce the rimpull such that the torque around the articulation joint is reduced to the maximum defined torque capability or below.

14. The method according to claim 13, wherein the determined torque around the articulation joint being at or above the maximum defined torque capability indicates an impending contact between the front frame segment and the rear frame segment.

15. The method according to claim 13, wherein the controlling the propulsion system to reduce the rimpull includes modulating a powertrain of the propulsion system.

16. The method according to claim 13, wherein the amount of torque by which to reduce the torque around the articulation joint to reach the maximum defined torque capability or below prevents any contact between the front frame segment and the rear frame segment.

17. The method according to claim 13, wherein the rimpull is reduced continuously until an articulation rate of the rear frame segment relative to the front frame segment reaches a predetermined target rate.

* * * * *